United States Patent Office 3,677,969
Patented July 18, 1972

3,677,969
HYDROGENATION OF ORGANIC COMPOUNDS
Joseph K. Mertzweiller and Horace M. Tenney, Baton Rouge, La., assignors to Esso Research and Engineering Company
No Drawing. Continuation-in-part of application Ser. No. 761,793, Sept. 23, 1968, which is a continuation-in-part of applications Ser. No. 674,097, Oct. 10, 1967, and Ser. No. 761,792, Sept. 23, 1968. This application Jan. 7, 1970, Ser. No. 1,281
Int. Cl. C07c 5/02
U.S. Cl. 252—431      27 Claims

ABSTRACT OF THE DISCLOSURE

Novel sulfided hydrogenation catalysts are formed by impregnating a suitable support material with an aqueous solution of a salt of a transition metal; heat-treating the impregnated support at a temperature above 500° F. to form chemical complexes on the surface of the support and to drive off moisture and absorbed oxygen; contacting the supported metal complex with hydrogen sulfide; activating the surface complex by contacting the supported metal sulfide complex with a soluble organometallic compound wherein the metal constituent is selected from Groups I, II and III of the Periodic Chart of the Elements, and thereafter treating the activated support material in the presence of a gaseous stream containing hydrogen at a temperature of at least 300° F. to form a highly stable heterogeneous sulfided catalyst. The novel supported catalysts of the instant invention have been found to be highly active for the hydrogenation of organic feedstocks containing sulfur under extremely mild conditions.

CROSS-REFERENCE TO RELATED APPLICATIONS

This application is a continuation-in-part of U.S. Ser. No. 761,793 which application is a continuation-in-part of Ser. No. 674,097, filed Oct. 10, 1967, now abandoned and Ser. No. 761,792, both of which were filed Sept. 23, 1968 and are now abandoned.

BACKGROUND OF THE INVENTION

This invention relates to a new and useful process for the preparation of high activity sulfided catalysts suitable for reactions between hydrogen and hydrocarbons and particularly for the hydrogenation, or hydrogen addition, to organic compounds containing nitrile groups, carbonyl groups, aromatic, acetylenic or olefinic linkages. It is also concerned with the novel catalysts so produced, as well as the processes for using these catalysts.

More particularly, this invention relates to impregnating a suitable support, as hereinafter defined, with a transition metal, contacting the supported metal complex with hydrogen sulfide and thereafter treating the supported sulfided catalyst with an organometallic compound under such conditions as to form a stable heterogeneous sulfided catalyst. Specifically, this invention relates to impregnating a suitable support material with a transition metal, contacting the supported metal complex at a temperature of at least 500° F. to drive off moisture and absorbed oxygen; contacting the supported metal complex with hydrogen sulfide; activating the supported metal sulfide complex with an organometallic compound and thereafter treating the activated species in the presence of a gaseous stream containing hydrogen under critically defined conditions in order to form the highly active, stable hydrogenation catalyst of the instant invention. This final step which comprises treating the activated supported catalyst in the presence of hydrogen under critically defined conditions is termed "fixation" and is critically important in preparing completely heterogeneous catalysts possessing extremely high activity and stability.

DESCRIPTION OF THE PRIOR ART

Various heavy metals, especially transition metals, have been previously described as useful for conducting catalytic reactions. Hydrogenation catalysts have included solid metals, slurries of metals, and metals dispersed on supports. Solid metal catalyst had been prepared by contacting oxides of the desired metal with reducing gases, e.g., carbon monoxide, or hydrogen, or both. Slurries suitable as catalyst have been prepared by contacting anhydrous solutions of organometallic compounds of the desired metal with organoaluminum compounds, these being brought together to form slurried catalysts. Metals have been provided on supports by impregnation of support with anhydrous solutions of the salts of the desired metal, this being found by reduction of the salts to produce deposition of metallic metal.

In Canadian Pat. No. 697,780, which issued Nov. 10, 1964, methods are described for improving the activity of cobalt and for converting certain inactive metals, i.e., manganese and molybdenum, into active hydrogenation catalysts. In typical reactions, slurried catalytic mixtures are produced by forming anhydrous solutions of soaps of the desired metal, and the desired organometallic reducing agent, and then contacting the two solutions together to form catalytic reaction mixtures. In accordance with one of the methods, a support is impregnated by contact with anhydrous or nonaqueous solution of a soap of the desired metal, and with an organometallic reducing agent, such as organoaluminum compound, to produce a loosely supported reaction product mixture of dispersed metals. In other techniques, supports are impregnated with soaps of the desired metal, and the support then contacted with a solution of the organometallic reducing agent to produce supported catalytic mixtures.

While these catalysts are moderately active hydrogenation catalysts, there are nonetheless a number of disadvantages associated with their use. For one thing, the materials, in all the phases of their use are highly pyrophoric and the slurries must be formed in an oxygen-free atmosphere. Also, the catalytic materials formed are highly pyrophoric. Thus, the catalytic product of the reaction is an insoluble pyrophoric solid which is highly reactive whether in slurry or supported form. Moreover, the material used in forming the catalysts are quite expensive, to say nothing of the cost involved, due to the extra precautions which must be taken in handling the materials. Furthermore, the organic solvents which are used are highly flammable.

In U.S. Pat. 3,415,759 there is disclosed a method for preparing a hydrogenation catalyst by depositing cobalt carboxylate on a diatomaceous earth support and heating the supported cobalt carboxylate at a temperature between about 135 and 160° C. and thereafter reacting the thus heat-treated product with an aluminum alkyl. However, when temperatures materially above about 160° C. are employed to dry the catalysts, the catalyst becomes progressively deactivated, particularly insofar as the hydrogenation of high molecular weight compounds are concerned.

In our copending application Ser. No. 880,933, filed Nov. 28, 1969, which application is a continuation-in-part of U.S. application Ser. No. 674,098, filed Oct. 10, 1967, now abandoned, new and improved hydrogenation catalyst employable in heterogeneous liquid and gas phase reaction systems are described. When transition metal salts, i.e. salts of Groups I-B, IV-B, V-B, VI-B and VII-B metals are deposited on suitable supports, contacted with organoaluminum compounds and treated in the presence of hydrogen at high temperatures, they become very highly active, and form catalysts which can produce hydrogenation of organic compounds even under very mild conditions of temperature and pressure. Unfortunately, these catalysts are very sensitive to impurities, especially those usually found in refinery and chemical process streams, particularly high sulfur content streams. Consequently, they tend to lose their activity.

In our copending application Ser. No. 1,282, filed Jan. 7, 1970 which application is a continuation-in-part of U.S. Ser. No. 674,097, filed Oct. 10, 1967, now abandoned, improved heterogeneous catalysts having reduced sensitivity to sulfur compounds and other poisons are described. These catalysts are formed by an additional activation step—viz., hydrogen sulfide activation, of the catalysts described in application Ser. No. 880,933, supra.

In the formation of the base catalyst, it was thus found that a high activity hydrogenation catalyst could be formed by the steps generally comprising: impregnating suitable support materials with salt solutions of Group VIII metals; heat-treating the impregnated supports to form chemical complexes at the surface of the support and to drive off the liquid and adsorbed oxygen; activating and further modifying the surface complex by contact of the impregnated supports with liquid soluble organometallic compounds wherein a metal constituent is selected from Groups I, II and III of the Periodic Chart of the Elements; and then contacting the activated supported metal complex in the presence of hydrogen at elevated temperatures. The high activity of the so activated catalyst is thus believed to result from a reduced complex containing aluminum, with either or both the Group VIII and the aluminum metal bonded to the support. An additional and final step of sulfiding the above-defined catalytic species, as described by application Ser. No. 1,282 filed, Jan. 7, 1970 produced a catalyst of reduced sulfur sensitivity. Such sulfur resistant species is believed to result from the formation of a few sulfur-containing complex.

While this new sulfur resistant species of catalysts, supra, is far superior to the earlier nonsulfied varieties for use in sulfur-containing feedstreams, it nonetheless leaves something to be desired. Thus, in preparing the sulfur-resistant heterogeneous species, soluble complexes of the metal are also formed and lost. This represents waste and inefficiency, baed on total metal. In addition, it is found that the catalyst is less stable and activity declines more than desired when hydrogenation reactions are conducted at elevated temperatures.

The present invention obviates the foregoing and other deficiencies and is based on the further discovery that a transition metal species can be first sulfided and thence activated with an organoaluminum compound to provide a more stable heterogeneous sulfided catalyst of even further enhanced hydrogenation activity, and even less sensitivity to sulfur and other poisons. Accordingly, the present catalysts can be used for the hydrogenation of organic compounds, including especially those containing aromatic or olefinic linkages, even under very mild conditions of temperature and pressure, and in the presence of sulfur. It is thus an object to provide more stable, easy to handle catalysts for use in a wide variety of processes, including selective hydrogenation, hydrogenation, dehydrogenation, isomerization, hydrodesulfurization, hydrodenitrogenation, hydrocracking, reforming, aromatization, and hydrogen transfer. A further object is to provide an efficient process for forming high activity catalysts, the process utilizing relatively cheap, readily available forms of metal salts applicable in aqueous media.

SUMMARY OF THE INVENTION

It has now been discovered that novel sulfided hydrogenation catalysts exhibiting unusually high activity and stability may be prepared by impregnating a suitable support material, as hereinafter defined, with an aqueous solution of a salt of a transition metal or by precipitating or coprecipitating transition metal salts from such solutions as gels; heat-treating the impregnated support at a temperature of at least about 500° F. to form chemical complexes on the surface of the support and to drive off moisture and absorbed oxygen; contacting the supported metal complex with hydrogen sulfide; actviating the supported metal sulfide complex by contacting the impregnated supports with a soluble organometallic compound wherein the metal constituent is selected from Groups I, II and III of the Periodic Chart of the Elements, and thereafter treating the activated sulfided support material in the presence of hydrogen at a temperature of at least 300° F. The present invention is based on the discovery that a highly tenaceous chemical bonding can be formed between the surface of certain types of supports and the transition metals and the metallic constituent of the soluble organometallic compound when the metals are applied to the supports under the sequence and critically defined conditions of the instant invention. While suitable loadings are quite feasible, precipiration or coprecipitation of a transition metal salt with a gel provides greater flexibility in metal content. Also, the gel, after dehydration and thermal activation, activates readily and substantially completely. Activity and selectivity are quite high as compared with impregnation.

In the sequence of process steps, a supporting material having a surface area of at least 5 square meters per gram and containing at least 0.1 millimole of hydroxyl groups per gram of support is first impregnated with a water-soluble species of a transition metal, preferably a Group I–B, IV–B, V–B, VI–B, VII–B or Group VIII metal. Water has been found particularly suitable for the application of the Group I–B, IV–B, V–B, VI–B, VII–B or Group VIII metals to the support by contacting or immersing the support in an aqueous solution of a salt of the desired metal. Suitably, the support is impregnated with from about 0.1 to about 20% metal, and preferably from about 2 to about 10% metal, based on the total weight of the deposited metal and support.

The impregnated support is then preconditioned by heating the impregnated support at a temperature of at least about 500° F. in order to drive off moisture and absorbed oxygen from the catalyst surface.

Thereafter, the sulfiding step is conducted by contacting the supported metal complex with hydrogen sulfide in the vapor phase at temperatures ranging preferably at from about 400° F. to about 1000° F., and more preferably from about 600° F. to about 800° F. At higher temperatures the activity of the catalyst may be diminished. The sulfiding step is carried out in a gaseous medium containing hydrogen sulfide, preferably in quantities ranging from about 0.1 to about 20% concentration, and more preferably in quantities ranging from about 1% to about 10% concentration. A typical sulfiding mixture is about 10% hydrogen sulfide/90% hydrogen. Higher concentrations of hydrogen sulfide are not generally desirable due to the practical necessity of removing the heats of reactions.

Virtually any sulfur-containing compound, or even elemental sulfur, can be used, e.g., in a hydrogen atmosphere, in forming the desired hydrogen sulfide. Hydrogen sulfide can be formed in gases at higher temperatures, and thence the temperature of the gas reduced to effect the sulfiding step.

After the catalyst has been sulfided at high temperatures, it is generally always observed that loosely held sulfide or sulfur compounds are present. If the catalyst is stripped with hydrogen, nitrogen or inert gases at temperatures of 400–1000° F. after the flow of hydrogen sulfide is removed, the exit gas will continue to show the presence of appreciable concentrations of hydrogen sulfide for a considerable period of time. For the most effective practice of this invention, it is desirable to remove as much of this loosely held sulfur as possible. If it is not removed, it will consume metal alkyl compound in the subsequent activation step. The loosely held sulfur compounds are conveniently removed by stripping with hydrogen or other gases in the absence of added sulfur at temperatures of 400–1000° F. for sufficient time to get the residual hydrogen sulfide in the off-gas to sufficiently low levels. At this point, the catalyst is properly sulfided and can be represented by a composition $MS_n$ in which M is the transition metal, S is sulfur, and $n$ is 0.5 to 3. In the sulfided form the transition metal M will generally be at a lower valence state than the oxide form of M.

The preconditioned sulfided catalyst is then activated by contacting the impregnated supports with a soluble organometallic compound wherein the metallic constituent is selected from Groups I, II and III of the Periodic Chart of the Elements and wherein the metallic constituent has an atomic number of from 3 to 50. Preferably, the organic constituent of the organometallic compound are alkyl groups, particularly linear alkyl groups having from 1 to about 12 carbon atoms. Only the organometallic compounds of Groups I, II and III which are soluble in hydrocarbon or soluble in or complex with ethers are suitable for the method of this invention. These are the organometallic species which are characterized by predominantly covalent bonding between the metal and the alkyl and/or hydride groups. The preferred metallic constituent of the organometallic compound is aluminum.

Thereafter, the activated supported material is treated by heating the activated supported material at a temperature of at least 300° F. in the presence of a gaseous stream containing hydrogen. Preferably, the activated supported material is treated in the presence of hydrogen at a temperature above 400° F., more preferably above 800° F. and still more preferably at a temperature in the range of from about 800° to about 1200° F. for a period of time in the range of from about 1 to about 100 hours. Surprisingly, it has been found that under these high severity conditions, i.e. treating the activated supported catalyst at a temperature above 800° and up to about 1200° F. in the presence of hydrogen, the activity of these catalysts is not significantly decreased and, in fact, generally increases as the treating severity is increased.

The sulfided, organoaluminum activated catalyst is then ready for use in a suitable reaction system for producing hydrogenation (also dehydrogenation) or other reactions. These catalysts, especially those formed by use of aqueous solutions of the salts of iron, cobalt and nickel, have proven themselves of exceptionally high activity. Olefins whether singular or multiple linkage compounds, aliphatic or cyclic have been readily hydrogenated to paraffins, and aromatic compounds have been saturated to produce the corresponding cycloalkanes. Acetylenic compounds, whether of singular or multiple linkage, or aliphatic or cyclic, can also be hydrogenated. This is generally so even where the feedstocks utilized in the reactions contained high concentrations of sulfur. The activity of the catalysts was virtually unimpaired even after long periods of use. Further, catalysts formed with salts of cobalt and iron in the initial step have proven highly satisfactory despite the normally low activity attributed to cobalt and the even lower activity attributed to iron for producing hydrogenation reactions.

There is some interference, however, by some types of sulfur compounds and the normal high activity can be impeded very gradually. Thus, although these catalysts normally have good resistance to sulfur types and concentrations normally present in petroleum stocks, there is evidence that certain sulfur compounds, e.g. mercaptans, tend to be adsorbed on the catalyst and may thereby cause some loss of activity. Even this effect, however, can be curtailed or eliminated by operating the catalysts at temperatures and pressures at which adsorption of the sulfur compounds is not favored. The conditions necessary to achieve this effect will vary with different feedstocks and different sulfur compounds.

In addition, it is entirely feasible to regenerate these catalysts by stripping with hydrogen at elevated temperatures, e.g. at temperatures of from about 400 to about 1000° F. The catalysts are amenable to complete regeneration by (1) oxidizing with air to remove carbonaceous residues, (2) re-sulfiding, and (3) reactivation with aluminum alkyl compound.

While the exact nature of the mechanism is not known and, though the applicants do not wish to be bound by a specific theory on mechanism, there are certain things which are known to occur in the formation of these catalysts. When a suitable support has been impregnated with a transition metal and heat-treated at a temperature of at least 500° F., there is believed to exist a chemical bonding between the surface of the support and at least some of the transition metal. This interaction is believed to occur between the acid sites on the support surface and the transition metal salt. Evidence of such interaction is obtained when, for example, iron is employed as the transition metal and is impregnated on a suitable support and heat-treated at a temperature of 500° F. in accordance with the practice of the instant invention, and examined by Mossbauer spectroscopy. Such an examination reveals that essentially all i.e. 99+% of the iron is in the +3 valence state and the Mossbauer pattern corresponds to no known oxide of iron nor to the iron salt employed in impregnating the suitable supporting material. Consequently, this interaction or chemical bonding between the support and the transition metal is believed to be responsible for the difficulty in reducing such a supported catalyst to metallic iron by treatment with hydrogen. For example, under conditions of 1 atmosphere hydrogen pressure at a temperature of about 1000° F., virtually all the iron is reduced to the +2 valence state, i.e. an inactive catalyst while little or no metallic iron is formed.

When the supported transition metal is contacted with hydrogen sulfide there are two reactions which are believed to occur: (1) reduction in the valence state of the transition metal due to the reducing action of the $H_2S$ or the $H_2S$-$H_2$ mixture and (2) replacement of at least a portion of the oxygen (or other anionic species) associated with the transition metal by sulfur. Since the sulfiding reactions are not truly stoichiometric, it is difficult to write meaningful chemical equations. However, the species types believed to be present after the sulfiding reaction can be illustrated for the transition metal M.

Sulfided species bound to support

Support —O—M—S— or Support —S—M—S— and sulfided species are bound to support $$\begin{matrix} M-S-M-S \\ | \\ S-M-S-M \end{matrix} \text{ or } \begin{matrix} M-S-M-O \\ | \\ O-M-S-M \end{matrix}$$

Both species are intended to represent medium size crystallites containing 4 to 20 or more atoms of M in combination with varying amounts of sulfur and oxygen. The amount of M in bound form and unbound form may vary considerably with the nature of M.

When the sulfided catalyst is treated with an excess of organometallic compound, $QR_n$, wherein Q represents a Group I, II or III metal, R is the organic constituent and wherein $n$ is equal to the valence state of Q, it is believed that the bond to the support is broken and a $QR_{(n-1)}$ fragment attaches to the supoprt and the metal M is alkylated by the remaining R group. The transition metal alkyl is unstable and stabilizes ttself by decomposing to a hydride plus olefin, as follows:

(1) Support —S—M—S.+$QR_n$→Support
—S—$QR_{(n-1)}$+R—M—S—
(2) R—M—S—→H—M—S—+R= (olefin)

The species R—M—S— and H—M—S— are intended to designate small to medium size crystallites of the transition metal containing at least one hydride (or alkyl) group and not simply one atom of M. These crystallites may contain 4 to 20 or more atoms of M with its anionic component (sulfur or oxygen).

Reactions similar to reactions (1) and (2) occur at other —M—S— bonds in the crystallite of M which is now no longer bonded to the support. This results in considerably smaller crystallites of M containing hydride groups, e.g.

(3) 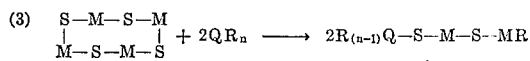 $+ 2QR_n \longrightarrow 2R_{(n-1)}Q-S-M-S-MR$

$2R_{(n-1)}Q-S-M-S-M-H + 2R^-$ (olefin)

Simultaneous with these reactions there are residual —OH groups on the support which react with $QR_n$ as follows:

(4) Support —CH + $QR_n \rightarrow$ Support —O—$QB_{(n-1)}$ + RH

The products of both reactions (3) and (4) contain R groups attached to Q which is also bonded to oxygen, sulfur or another anionic species. This renders the remaining R groups on Q less reactive for reactions (1) and (3). If the temperature is increased substantially (above 300° F.) these R groups become reactive. The result is (1) a further decrease in the crystallite size of M and (2) formation of additional hydride groups of M.

A most important reaction is that occurring between a hydride crystallite of M (e.g. the product of reaction (3)) with an R group from the product of reaction (4) at elevated temperatures. This leads to a still smaller hyride crystallite of M chemically bonded to Q which is strongly bonded to the support at the site of an original hydroxy group.

(5)
$R_{(n-1)}Q-S-M-S-M-H$ + Support —O—$QR_{(n-1)}$ ⟶
Support —O—Q—$R_{(n-2)}$—S—M—H + $R_{(n-1)}$—Q—S—M—R

$R_{(n-1)}-Q-S-M-H + R^-$

When the reaction is forced to completion at elevated temperatures in the presence of hydrogen all the Q—R groups (or Q—H groups formed therefrom) are reacted according to reactions (1), (3), (4) and (5) and there results an extremely active and stable catalyst. The activity is due to the extremely small crystallites of M hydride-sulfide and the stability is due to the strong bonding to the support, reaction (5).

Use of a catalyst having an atomic dispersion of sites such as: Support —O—Q(S—M—H)$_2$ with sulfur feeds generates $H_2S$ and hydrogenalysis will probably result in an equilibrium of the type —S—M—H + $H_2S \rightleftharpoons$ —S—M—S—H + $H_2$ while retaining the near atomic dispersion property. Since the —S—M—H species is probably more active than the —S—M—S—H species the higher the sulfur content of the feed the higher the hydrogen pressure and temperature required.

Thus, it is believed that the applicants have discovered a new route to a valuable and novel heterogeneous catalyst which is believed to involve chemical bonding between the support, transition metal and metallic constituent of the organometallic reducing agent which allows for a highy dispersed and highly active catalyst which is stable under high severity conditions.

The selection of a suitable support material upon which the transition metal is impregnated is an essential feature of the instant invention. Suitable supports are those having a reasonable surface area and a sufficient concentration of hydroxyl groups on the surface, which hydroxyl groups are capable of reacting with an organometallic compound, i.e. $QR_n$ or $OR_nX_n$, where Q represents a Group I, II or III metal, R represents the organic constituent i.e. an alkyl groups of the organometallic compound or hydrogen, and wherein X equals a halogen, in order to eliminate the RH species and attach the $OR_{n-1}$ species to support surface through the oxygen atom of the original hydroxyl group. Properties and suitability of supports can be characterized in terms of surface area and their hydroxyl content measured by reaction with an organometallic i.e. $QR_n$ compound in the absence of a transition metal.

Those supports most suited to the instant invention include the oxides of Groups II, III and IV of the Periodic Chart of the Elements which can be prepared with surface areas in excess of 5 square meters per gram and wherein the hydroxyl content of the support is at least 0.1 millimole of hydroxyl groups per gram of support. The oxides of Groups II, III and IV having a surface area in excess of 50 square meters per gram and containing a hydroxyl group content of at least 0.2 millimole of hydroxyl groups per gram of support, determined by reaction of the support with the organometallic compound in the absence of the transition metal are preferred. Aluminum oxide having a surface area of above about 100 square meters per gram and a hydroxyl content of at least 1 millimole per gram is the most preferred supporting material of the instant invention. Additional, nonlimiting examples of suitable supporting materials include magnesium oxide, zinc oxide, titanium oxide, provided they have the necessary surface areas and reactive hydroxyl group content as described above. Many types of supports, while possessing the desired surface area, may or may not have the desired reactive hydroxy group content. Nevertheless, some such supports, for example, activated carbon, can be enhanced in hydroxyl group content by treatment with air or an air-steam mixture at moderate temperatures, i.e. below about 1000° F. in order to form a suitable support for the catalyst of the instant invention. Other well-known supports, such as silica, have a sufficient surface area but may lack the necessary concentration of reactive hydroxyl groups and are not suitable. Silica-alumina supports, having the necessary hydroxyl group concentrations are effective supports and may also be employed in the practice of the invention.

The supported catalyst of the instant invention may be prepared by any means conventionally used for the preparation of a supported catalyst, e.g. by impregnating the support or by precipitation in the presence of the support or by coprecipitation with the supporting material. Water has been found to be particularly suitable for the application of the transition metal salt to the supporting materials. Preferably, the support is first impregnated with a water-soluble species of the transition metal salt by contacting or immersing the support in an aqueous solution of the salt of the desired metal. Preferably, the support is impregnated with from about 0.1% to about 30% equivalent transition metals; and preferably from about 1% to about 10% equivalent transition meal, based on the total weight of the deposited equivalent metal and support. The optimum concentration of transition metal on the support will depend on the nature of the transition metal and on the surface area and hydroxyl content of the support. For example, when a pure activated alumina having a surface area of about 200 square meters per gram and a hydroxyl content of about 1.2 millimoles per gram is employed as the supporting material, and when iron is employed as the transition metal, the optimum concentration of iron is about 0.6 millimole of iron per gram support. With noble metals, for example much lower concentration in the range of 0.1% to 1% are employed. The optimum concentration for other transition metals which results in the highly active, stable catalysts of the instant invention are not known with exactitude because of the many and varied supports which can be employed herein. Nevertheless, it is believed that one skilled in the art can readily determine these concentrations in view of the fact that they are within the preferred concentration ranges as described above.

The use of water to effect the chemical bonding is particularly important in the impregnation of the supports with salts of the desired transition metal. Even iron has produced an exceptionally active catalyst when applied to the support in the form of salts dissolved in aqueous solution. In fact, catalysts derived from aqueous solutions of iron salts have even proved highly effective for the hydrogenation of aromatic nucleus and carbonyl groups of organic compound, i.e. aldehydes and ketones.

The transition metals which can be employed in the practice of the instant invention include the Groups I–B, IV–B, V–B, VI–B, VII–B, and Group VIII metals. Preferably, the transition metals which can be employed in the practice of the instant invention include iron, cobalt, nickel, platinum, tungsten, chromium, vanadium, molybdenum, rhenium, manganese, titanium, zirconium, niobium, palladium, rhodium, copper, silver and gold. The most preferred transition metals include iron, cobalt and nickel, platinum, tungsten, chromium, molybdenum, vanadium, rhenium and copper. Nonlimiting examples of salts which can be employed for the application of these metals to these supports include the halides, sulfates, nitrates, formates, acetates, propionates, molybdate, vanadates, chromates, dichromates, tungstates, manganates, titanates, zirconates, rhenates, perhenates and the like. Water soluble acids such as perrhenic acid may also be employed. These various transition metals described above may be used alone or in combination.

The impregnated support in powder or granular form, is then treated by establishing time-temperature relationships suitable to produce a chemical change on the surface of the support and remove water and absorbed oxygen. Suitably, the impregnated support can be heated in air, in an inert atmosphere or in vacuum, e.g. 20 to 29 inches of vacuum at a temperature of at least about 500° F. preferably 600 to 1500° F. and more preferably from about 600° to about 1000° F. It is a critical feature, in order to form the more highly active and stable catalyst of the instant invention, to heat the impregnated support at a temperature above 500° F. for a period of time in the range of about 0.5 to about 4 hours and preferably from about 1 to 2 hours. While the heat-treatment may be performed in air or an oxygen atmosphere, it must then be followed by a period in an inert atmosphere in order to remove the adsorbed oxygen. In addition to the removal of oxygen and moisture, other important reactions occur during this heat-treatment, as described above, in order to render the transition metal in a form more amenable to the subsequent reaction with the organometallic compounds.

In an alternative embodiment, the impregnation and heat-treating steps can be conducted in multiple stages. For example, the support can be impregnated and then dried or partially dried, at low temperature. The support can then be reimpregnated and again dried or partially dried. The heat treatment per se may be conducted in multiple stages, if desired. The impregnated support, to facilitate handling, can thus be subjected to a first rather mild heat treatment to dry the support and then, in a second step, to a more severe treatment to produce the desired chemical change at the surface of this support. Supported catalysts, such as are supplied by the commercial catalyst manufacturers, e.g. iron, cobalt and/or nickel, alone or in combination with other metals such as molybdenum, tungsten, or the like are also amenable to such treatments to transform them to highly active catalysts.

The then impregnated, heat-treated support after being contacted with hydrogen sulfide as described above is activated by treatment with an organometallic compound, suitably a hydrocarbon solution of an organometallic compound, or a hydrocarbon soluble organometallic compound, a metallic constituent of which is selected from Groups I, II and III of the Periodic Chart of the Elements as in Fisher Scientific Company Copyright 1952. Preferably the organometallic compounds include those having the formula: $QR_n$ wherein Q is equal to the metallic constituent and is selected from Groups I–A, II and III having an atomic number of from 3 to 50, $n$ is the valence state of Q and wherein R is the organic constituent and is selected from the group consisting of hydrogen or the same or different, substituted or unsubstituted saturated or unsaturated alkyl, aryl, alkylaryl, arylalkyl or cycloalkyl groups containing up to about 20 carbon atoms. Representative, non-limiting examples of the organic constituents, i.e. R include, but are not limited to methyl, ethyl, n-propyl, isopropyl, isobutyl, secondary butyl, tertiary butyl, n-amyl, iso-amyl, heptyl, n-octyl, n-dodecyl and the like; 2-butyl, 2-methyl-2-butyl, and the like; cyclopentylmethyl, cyclohexylethyl, cyclohexyl-propyl and the like; 2-phenylethyl, 2-phenylpropyl, 2-naphthylethyl, methylnaphthylethyl and the like; cyclopentyl, cyclohexyl, 2,2,1-bicycloheptyl and the like; methylcyclopentyl, dimethylcyclopentyl, ethylcyclopentyl, methylcyclohexyl, dimethylcyclohexyl, 5-cyclopentadienyl and the like; phenylcyclopentyl, and the like, phenyl, tolyl, ethylphenyl, xylenyl naphthyl, cyclohexylphenyl and the like. The more preferred metallic constituent of the organic metallic compound i.e. Q is selected from the group consisting of lithium, magnesium, beryllium, zinc, cadmium, mercury, boron aluminum, gallium and indium. In addition, organometallic compounds having the formula $QR_nX_m$ may be employed as the organometallic compound of the instant invention where Q and R are identical to the Q and R having been previously described, X is a halogen, and $n$ and $m$ are integers ranging from 1 to 3, the summation equal to the valence of Q.

The most preferred organometallic activating agents are the tri-alkyl substituted products of aluminum and the dialkyl halides of aluminum, particularly those containing alkyl groups having from one to about 6 carbon atoms, especially the linear alkyl groups. Exemplary of such compounds, which contain up to about 18 carbon atoms in the molecule, are trimethyl aluminum, triethyl aluminum, tri-n-butyl aluminum, tri-isobutyl aluminum, diethyl aluminum hydride, diethyl aluminum chloride, diethyl aluminum fluoride and the like. Certain volatile or hydrocarbon-soluble hydrides, for example, the various known hydrides of boron, are also suitable activating agents as well as are the Grignard reagents.

The treatment of the supported, heat-treated sulfided catalyst with the organometallic compound can be carried out with pure or diluted metal alkyl compounds in the liquid or vapor phase. Hydrocarbon diluents of the paraffinic, cycloparaffinic or aromatic types are entirely suitable. The metal alkyl compound may be present in concentrations of 5% to 50% in the diluent. A solution of about 20% aluminum triethyl in a paraffinic diluent is a preferred activation system. The activation reaction is quite exothermic and it may be desirable to remove the heat of activation. The temperature during the activation step, which is maintained in the range of from about 0° F. to about 500° F., preferably from about 100° F. to about 200° F. Considerable gas liberation occurs during activation and these gases are normally vented from the system. The activation is allowed to proceed until reaction is no longer observed, generally 0.5 hr. to 2 hrs. in contact with at least some excess of metal alkyl compound.

The treatment of the activated support material in order to obtain the most active and stable catalysts referred to above as the "fixation" step is a critical feature of the instant invention. After the supported sulfided catalyst has been activated with the organometallic reducing agent, it is essential that the supported catalyst be treated in the presence of a gaseous stream containing hydrogen at a temperature of at least 300° F. in order to form the highly active, stable, novel heterogeneous catalyst of the instant invention. Preferably, the supported activated catalyst is treated in the presence of hydrogen at a temperature in the range of from about 300° F. to about 1200° F., more preferably from about 400° F. to about 1200° F. and still more preferably between about 800° F. and 1200° F. It is essential that this fixation treatment be conducted in the presence of a gaseous stream containing hydrogen. This fixation treatment can be carried out in the presence of nitrogen or inert gases such as helium, argon, and the like in view of the fact that hydrogen is formed "in situ" when these inert gases are employed. Necessarily, however, the fixation in the presence of nitrogen or inert gases such as helium, and argon will result in catalysts of lower activity than when the fixation step of the activated support catalyst is conducted totally in the presence of a hydrogen gas.

Although nitrogen is normally considered an inert gas, there is evidence that it may not be truly inert when present in the fixation of these catalyst systems. There is some evidence that gaseous nitrogen may react with the transition metal species at elevated temperatures. Such reaction which may form nitrides of the metals are obviously undesirable. Therefore, it is preferred that the fixation step be conducted at the above critical temperatures in the presence of a gaseous stream containing or resulting in the formation in the reaction zone of from about 5 to 100% hydrogen and more preferably from about 75 to about 100% hydrogen. Most preferably, the fixation under the above-described critical temperature conditions is conducted totally in the presence of a hydrogen atmosphere. As described above, it is believed that the function of hydrogen during the "fixation step" when the supported activated catalyst is treated under the critical temperature limitation described above, is to fix the catalyst in a stable heterogeneous form and to further stabilize the transition metal compound to a valence state in which it can more readily and completely react the metallic portion of the organometallic compound.

The fixation of the supported activated catalyst in the presence of a hydrogen gas under the above-described critical conditions is usually conducted over a period of time varying between about 1 to about 100 hours, generally less time being required at higher temperatures. As described above, it is quite surprising that under optimum conditions as described above, it can be shown that the activity of the catalysts of the instant invention increases as the length of time in which the supported activated catalyst is being treated in the presence of hydrogen at high temperatures, e.g. 800–1200° F. increases. This, again, is believed to be due to the fact that the instant invention results in completion of a series of reactions leading to a chemical bonding between the surface of the support and the transition metal and metal constituent of the organometallic compound such that these metals are not free to migrate on the surface of the catalyst and grow large crystallites. The formation of large crystallites in conventional supported catalyst is generally accepted as an important mode of catalyst deactivation. Thus, the catalyst of the instant invention are highly active at extremely mild hydrogenation conditions as well as exhibiting unusual stability at high severity conditions.

The fixation in the presence of hydrogen under the above-described temperature conditions can also be influenced by the hydrogen pressure at which such a treatment is conducted. Generally, atmospheric or near atmospheric pressure, from about 0.5 to about 1.5 atmospheres is employed. However, the hydrogen partial pressure may be increased in the reaction zone up to 100 atmospheres or greater. The hydrogen partial pressure will generally decrease the time-temperature requirements for forming the chemical bonding between the supports and a transition metal and metallic portion of the organometallicic compounds.

The so-treated catalysts are then ready for contact with hydrogen or hydrogen-containing gases, a suitable reaction system for producing hydrogenation (or dehydrogenation) reactions. Olefins, whether singular or multiple linkage compounds, aliphatic or cyclic, and containing 2 to about 50 carbon atoms have been readily hydrogenated to paraffins, and aromatic compounds containing from 6 to about 50 carbon atoms, and more preferably from about 6 to about 30 carbon atoms have been saturated to produce the corresponding cycloalkane. Acetylenic compounds, whether singular or multiple linkage, aliphatic or cyclic in containing from about 2 to about 10 carbon atoms can also be hydrogenated by the catalyst of the instant invention. In fact, catalyst formed by the impregnation of the supports with aqueous salts of cobalt, and iron have proven highly satisfactory despite the normally low activity attributed to cobalt and even lower activity attributed to iron for producing hydrogenation reactions.

The catalysts can be utilized as slurries or as fixed beds, movable beds and fluidized beds, in liquid phase or vapor phase, in batch, continuous or staged operations. Hydrogenation reactions can be carried out at remarkably low temperature and pressures as contrasted with the more conventional catalysts, whether the reaction is conducted in liquid phase or vapor phase. Hydrogenation reactions are generally conducted at temperatures ranging from about 0° F. to about 1000° F., and preferably at temperatures ranging from about 100° F. to about 500° F. The reactions can be conducted at lower than atmospheric pressures or at supra atmospheric pressures, but generally pressures ranging from as low as about 1 atmosphere to about 500 atmospheres can be employed. Preferably, however, pressures ranging from about 1 atmosphere to about 50 atmospheres are employed in conducting the reactions.

These catalysts are suitable for carrying out hydrogenation reactions in systems designed to handle high heats of reaction and severe contacting problems, without substantial deterioration and separation of catalyst from the support. This is due in large part to the high stability and activity of these catalysts, by virtue of which hydrogenation reactions can be conducted at very low hydrogen partial pressures ranging as low as from about 1 to about 200 atmospheres.

When it is desired to carry hydrogenation reactions essentially to completion, an excess of hydrogen over the stoichiometric requirement is used. This excess may vary from a few percent to several hundred or even several thousand percent. In the latter cases, the excess hydrogen is separated and recycled to the system. When it is desired to carry out partial hydrogenations, the reaction can be controlled on the basis of hydrogen concentration e.g., mol ratio of $H_2$ to feed, or reaction kinetics, e.g., using an excess of hydrogen and controlling reaction time, temperature, $H_2$ partial pressure and the like.

These and other features of the invention will be understood by reference to the following illustrative examples.

The following examples present comparative data which are illustrative of the present invention. The examples demonstrate techniques and procedures for preparing highly active and stable heterogeneous catalysts. The base materials are prepared by both impregnation and precipitation techniques. Octene-1 has been selected to demonstrate the hydrogenation reaction because it follows well defined first order kinetics, and hence activities are measured in terms of reaction rate constants. In the comparative data it will be at once apparent that the catalysts show a remarkable enhancement in activity directly attributable to the organoaluminum activation.

Examples 1 and 2, immediately following, demonstrate in direct comparative sense the high activity associated with activation of the organoaluminum compound.

EXAMPLE 1

Nickel nitrate (125 grams $Ni(NO_3)_2 \cdot 6H_2O$) was dissolved in sufficient water to form 325 cubic centimeters (cc.) of the solution. This solution was used to impregnate 500 grams F-1 activated alumina (8-14 mesh Tyler Series). Essentially all the solution was absorbed by the aluminum. The catalyst was dried in a vacuum oven at 380–390° F. to provide a light green solid.

An electrically heated quartz tube was charged with 60 cc. of the above catalyst which was heated at about 800° F. in a stream of dry nitrogen for two hours. The evolution of $NO_2$ was complete in about one hour at 800° F. The temperature was decreased to about 600° F. and sufficient hydrogen sulfide was added to give 5–10 percent hydrogen sulfide in the mixture. Sulfiding was continued for 3.5 hours and the catalyst was then stripped with nitrogen at 800° F. for one hour to remove residual hydrogen sulfide. The catalyst analyzed 4.4 percent nickel and 1.66% sulfur or a composition of approximately $NiS_{0.7}$.

The above catalyst (47 grams) was charged with 250 cc. of octene-1 to a stirred autoclave. A hydrogen pressure of 200 p.s.i.g. was placed on the autoclave and the contents heated to 170° F. The pressure increased and maintained steady at 220 p.s.i.g. There was no evidence of pressure drop and a sample withdrawn after 15 minutes shows 100% octene by vapor chromatographic analysis.

The temperature was increased to about 300° F., increasing the pressure to a steady value of 395 p.s.i.g. Under these conditions, the rate of hydrogenation of the octene was about 0.3% per hour or a total of 1.43% n-octane formed in 5 hours.

EXAMPLE 2

The catalyst was prepared and sulfided as described in Example 1. After the sulfiding was complete, the catalyst was cooled to room temperature under dry nitrogen in the quartz tube. The catalyst bad was flooded from the bottom with a 20 percent solution of triethyl aluminum in n-heptane. A vigorous reaction with considerable gas evolution occurred and the temperature in the catalyst bed reached a maximum of 185° F. The reaction subsided after a few minutes and, after standing for 35 minutes, the essentially colorless liquid was drained off. Uncombined aluminum triethyl was removed by stripping the catalyst with dry nitrogen at 400° F. for one hour.

The above catalyst (50.5 grams) was charged with 250 cc. of octene-1 to the stirred autoclave, care being taken to avoid exposing the catalyst to air. The autoclave was pressured to 200 p.s.i.g. with hydrogen and the temperature increased to 170° F. A pressure drop of 8–10 lbs./minute was observed, and the pressure was maintained in the range of 155–200 p.s.i.g. by incremental addition of hydrogen. Samples were withdrawn periodically and analyzed by vapor chromatography with the following results:

|  | Reaction time, minutes | | |
| --- | --- | --- | --- |
|  | 30 | 120 | 240 |
| Percent: | | | |
| Octane | 29.8 | 89.5 | 100 |
| Octene | 70.2 | 10.5 | Nil |

The hydrogenation was complete by pressure drop observation in slightly less than four hours. The increase in activity of the catalyst attributable to the activation with triethyl aluminum is at least several hundred-fold.

EXAMPLES 3–7

A series of runs was made on a commercial hydrogenation catalyst. This catalyst consists of 10–12 percent nickel (oxide form) on activated alumina. The pelletized catalyst was crushed and screened to 15–50 mesh particle size. Results of this series of runs are given in Table I.

These results show quite clearly that sulfur compounds such as thiophene do inhibit the activity of these catalysts at low hydrogenation temperatures but that the effect is largely reversible. The catalyst can be regenerated to an activity level approaching that of the nonpoisoned catalyst by stripping with hydrogen at elevated temperature.

TABLE I.—HYDROGENATION OF OCTENE-1 WITH GIRDLER T-310 CATALYST

| Example | 3 | 4 | 5 | 6 | 7 |
| --- | --- | --- | --- | --- | --- |
| Catalyst activation | Sulfiding [1] only | Sulfiding [1] followed by AlEt₃ treat.[2] | Catalyst from Example 4. | Catalyst from Example 5. | Regen.[3] catalyst from Example 6. |
| Sulfur compound | None | None | 0.4 weight percent thiophene. | 0.4 weight percent thiophene. | None. |
| Activity, k percent $H_{2-1}$ | 0.1 | 19.1 | 6.7 | 2.0 | 10.8 |

[1] Sulfiding conditions: 16 hours at 700° F., pure H₂S followed H₂ stripping for 2 hours at 800° F.; [2] AlEt₃ (aluminum triethyl) treat conditions: Room temperature, liquid phase with 20% AlEt₃ solution for 1 hour followed by stripping with H₂ for 2 hours at 400° F.; [3] Catalyst regenerated by stripping with H₂ for 2 hours at 600° F.

EXAMPLES 8–9

A commercial hydrofining catalyst consisting of nickel-tungsten supported on activated alumina (65 cc. catalyst) was placed in the quartz tube and treated for 17 hours at about 800° F. with dilute hydrogen sulfide (about 10 percent hydrogen sulfide in nitrogen). The catalyst was stripped with pure nitrogen at 800° F. for one hour to remove free hydrogen sulfide. The catalyst was analyzed 4.3% Ni, 17.0% W and 8.6% S after the sulfiding treatment.

This sulfided catalyst (40 grams) was tested for hydrogenation of octene-1 at 170° F. and 400 p.s.i.g. hydrogen pressure and showed very low activity. The same catalyst was then placed back in the quartz tube and freed of residual hydrocarbon by stripping with dry $N_2$ at 600° F. for one hour. The catalyst was then activated with aluminum triethyl as described in Example 2. The activity was then determined from hydrogenation of octene-1. Activities of catalyst in the sulfided form and AlEt₃ activated sulfided form are compared below:

| Example | 8 | 9 |
| --- | --- | --- |
| Form of catalyst | Sulfided only. | Sulfided and AlEt₃ activated |
| Percent hydrogenation of octene-1 at 170° F. and 400 p.s.i.g. at end of second hour. | 1.2 | 30.7 |

The aluminum alkyl activated sulfided catalyst is thus more than 20 times more active than the sulfided form of the same catalyst.

EXAMPLE 10

A catalyst was prepared by impregnating 100 gms. F-1 alumina with 80 ml. of solution containing 0.56 gm. Pt as $H_2PtCl_6$. Essentially all the solution was absorbed and the catalyst, after drying in the vacuum oven, contained 0.5 percent Pt.

A quartz tube was charged with 51 gms. of the above catalyst and heated for 1 hour at 800° F. in dry nitrogen. The gas was changed to pure $H_2S$ and the catalyst was sulfided at 800° F. for 17 hours. The sulfiding gas was cut out and the catalyst stripped with dry nitrogen for one hour at 800° F.

After cooling, the catalyst was discharged into an autoclave containing 250 ml. octene-1. Hydrogenation at 300° F., then at 350° F., for two hours at 600 p.s.i.g. hydrogen pressure showed no evidence of reaction as determined by pressure drop. The discharged liquid product showed no significant concentration of octane by vapor chromatography.

The catalyst was placed in the quartz tube and dried by stripping with dry nitrogen at 400° F. for one hour. After cooling to room temperature, the catalyst bed was flooded with a 20 percent solution of AlEt$_3$ in n-heptane. The temperature reached a maximum of 180° F. After about one hour the solution was withdrawn and the catalyst was heated at 400° F. for 2 hours in a flow of dry hydrogen.

The above catalyst was charged to the autoclave with 250 cc. octene-1 and the hydrogenation carried out at 300° F. and 600 p.s.i.g. hydrogen pressure. The initial rate of hydrogen absorption was 70–80 pounds per minute and the reaction was complete in ten minutes. The product showed no detectable quantity of octene by vapor chromatography.

EXAMPLE 11

The high activity catalyst from Run 10 was rinsed twice with benzene and charged to the autoclave with 250 cc. benzene. Hydrogenation at 300° F. and 600 p.s.i.g. hydrogen pressure showed an initial hydrogen absorption rate of 20–25 pounds per minute. Only cyclohexane resulted from hydrogenation of the benzene. The reaction rate was determined by vapor chromatographic analysis of samples withdrawn as follows:

| Time on conditions, hr.— | Percent hydrogenation of benzene |
|---|---|
| 1 | 27.5 |
| 2 | 56 |
| 3 | 77.5 |

EXAMPLE 12

200 gms. of alcoholate alumina granules (14–20 mesh) was impregnated with a 125 cc. of solution containing 26 grams cobaltous acetate (·4H$_2$O) to give a catalyst which, after drying, was calculated to contain about 3 percent cobalt.

50 cc. of the above catalyst was charged to the quartz tube and heated at 800° F. for one hour in a flow of dry nitrogen. The catalyst was sulfided with a mixture of about 10 percent hydrogen sulfide, 90 percent hydrogen for 17 hours at 800° F. After cutting out the sulfiding gas, the catalyst was stripped with hydrogen for one hour at 800° F.

The above catalyst was tested for hydrogenation of octene-1 at 300° F. and 665 p.s.i.g. hydrogen pressure. About 1.5 percent of the octene was hydrogenated in one hour at these conditions.

The catalyst from the above run was charged back to the quartz tube and stripped of volatile material with dry nitrogen at 300° F. for 1½ hours. The quartz tube was then flooded with a 20 percent solution of triethyl aluminum giving a maximum temperature rise to 135° F. from room temperature. After one hour, the solution was withdrawn and the catalyst given a final fixation at 400° F. in a hydrogen atmosphere for one hour.

The AlEt$_3$ activated catalyst was then tested for octene hydrogenation at 260° F. and 600 p.s.i.g. hydrogen pressure. The hydrogenation of the octene to n-octane was complete in 6 minutes.

EXAMPLES 13–14

A catalyst was prepared by impregnating 200 gms. of F–1 alumina with a solution prepared by dissolving 3 cc. pyrrhenic acid (1.3 gms. Re/cc.) to a total volume of 120 cc. in water. All solution was taken up by the alumina. The dried catalyst contained approximately 2 percent rhenium on the support.

The above catalyst (50 cc.) was sulfided in pure hydrogen sulfide at 800° F. for 16 hours, then stripped with hydrogen and cooled under hydrogen. Activity was determined for hydrogenation of octene-1 at 600 p.s.i.g. hydrogen pressure. There was no measurable activity at 170° F. and slight activity at about 300° F.

The same catalyst was placed back in the quartz tube, stripped with dry nitrogen at 800° F. to remove residual hydrocarbons, then activated with triethyl aluminum.

The catalyst bed was flooded from the bottom with a 20 percent solution of triethyl aluminum in n-heptane. A vigorous reaction with considerable gas evolution occurred and the temperature in the catalyst bed reached a maximum of 185° F. The reaction subsided after a few minutes and after standing for 35 minutes the essentially colorless liquid was drained off. Uncombined aluminum triethyl was removed by stripping the catalyst with dry hydrogen at 400° F. for one hour.

The activity was again determined for hydrogenation of octene-1. The activity enhancement attributed to activation by triethyl aluminum was about 20-fold as shown in the table below:

| Example | 13 | 14 |
|---|---|---|
| Form of catalyst | Sulfided only. | Sulfided plus AlEt$_3$ activated. |
| Percent hydrogenation of octene-1 at 300° F., 600 p.s.i.g.: | | |
| 0.5 hour | 5.7 | 75.0 |
| 1.5 hours | 11.5 | Ca. 100. |

EXAMPLE 15

The catalyst used in Example 14 was used to hydrogenate 250 cc. of an equal volume mixture of benzene and octene-1 at 260° F. and 600 p.s.i.g. hydrogen pressure. Analysis of samples withdrawn periodically showed that the octene-1 was hydrogenated selectively.

| Reaction time, hours | 0.5 | 1.0 | 1.5 | 2.0 | 5.5 |
|---|---|---|---|---|---|
| Product composition: | | | | | |
| n-Octane | 19.6 | 28.5 | 34.3 | 38.4 | 43.9 |
| Octene | 31.2 | 21.9 | 15.2 | 12.5 | 6.6 |
| Benzene | 49.2 | 49.6 | 50.5 | 49.1 | 49.5 |

EXAMPLE 16

A catalyst was prepared by impregnating 200 gms. F–1 alumina (8–14 mesh) with a solution of 31 gms. ammonium meta tungstate (68% W) in 110 cc. water. After drying in the vacuum oven, the catalyst weighed 223 gms. and contained about 9 percent tungsten.

This catalyst (60 ml.) was charged to the quartz tube and heated at 800° F. in a flow of dry nitrogen about 3 hours. The nitrogen was replaced with a mixture of hydrogen sulfide and hydrogen (10–20% hydrogen sulfide) and sulfiding was continued for 17 hours and the catalyst was stripped with hydrogen for one hour. The analysis of the catalyst was 8.9 percent W, 2.37 percent S or an approximate composition of WS$_{1.5}$.

The activity of this catalyst was determined for hydrogenation of octene-1 at 300° F. and 600 p.s.i.g. hydrogen pressure. Results were as follows:

| Run time, hrs.— | Percent hydrogenation |
|---|---|
| 1 | 9.5 |
| 2 | 14.7 |
| 3 | 19.5 |
| 4 | 22.7 |

The same catalyst was then charged back to the quartz tube and activated with triethyl aluminum in the manner described in Examples 1 and 2, the final thermal treatment at 400° F. being carried out in a flow of dry hydrogen.

The AlEt$_3$ activated catalyst was then tested again for hydrogenation of octene-1 at 306° F. and 600 p.s.i.g. hydrogen pressure. Gas absorption was complete and the product was completely paraffinic after 0.75 hour on conditions.

EXAMPLE 17

The AlEt$_3$ activated catalyst from Example 16 was used without further treatment to hydrogenate a 250 cc. charge of octene-1 containing 0.1 weight percent added thiophene. At 300° F. and 600 p.s.i.g. hydrogen pressure, the reaction was complete and the product entirely paraffinic after about 1.25 hours on conditions.

EXAMPLE 18

The catalyst from Example 17 was used without further treatment to hydrogenate a 250 cc. charge of octene-1 containing 0.1 weight percent added octyl mercaptan at 300° F. and 600 p.s.i.g. hydrogen pressure. The reaction was complete and the product entirely paraffinic after 1.25 hours on conditions.

EXAMPLE 19

A tungsten on alumina catalyst was prepared as described in Example 16 except that a high purity alcoholate type activated alumina was used in place of F–1 alumina as the support. A portion of the catalyst was sulfided, and it was found that the sulfided catalyst was essentially inactive for hydrogenation of octene-1 at 300° F. and 600 p.s.i.g. hydrogen pressure (no conversion of octene in 2 hours on conditions).

Another portion of the catalyst was then activated with AlEt$_3$ as described by reference to Example 16. The AlEt$_3$ activated sulfided catalyst was so active at 300° F. and 600 p.s.i.g. hydrogen that the activity could not be measured with any degree of precision. The reaction was complete in 5–6 minutes on conditions. The activity was determined at 212° F. and 600 p.s.i.g. hydrogen as follows:

| Reaction time, minutes— | Percent hydrogenation |
|---|---|
| 5 | 61 |
| 10 | 76 |
| 15 | 91 |
| 20 | 96 |
| 30 | 99 |

EXAMPLE 20

The catalyst from Example 19 was used without further treatment to hydrogenate 270 cc. of benzene at 300° F. and 600 p.s.i.g. hydrogen pressure. Results were as follows:

| Reaction time, hours— | Percent hydrogenation |
|---|---|
| 0.5 | 8 |
| 1.0 | 15 |
| 2.0 | 27 |
| 3.0 | 42 |
| 5.0 | 64 |

These conditions are much milder than any condition known for hydrogenation of aromatics with sulfides of transition metals. The selectivity is essentially 100 percent to cyclohexane.

EXAMPLE 21

A catalyst was prepared by impregnating 200 gms. F–1 alumina (8–14 mesh) with a solution of 27 gms. of ammonium heptamolybdate (82% MoO$_3$) in 110 ml. water. The vacuum dried catalyst contained about 8 percent Mo by weight.

The catalyst was treated at 800° F. in a flow of dry nitrogen for 1½ hours, then sulfided at 800° F. with a mixture of hydrogen sulfide and hydrogen (10–20% hydrogen sulfide) for 1–6 hours. The catalyst was stripped at 800° F. with hydrogen for one hour. This catalyst was tested for hydrogenation of octene-1 at 300° F. and 600 p.s.i.g. hydrogen with the following results:

| Reaction time, hrs.— | Percent hydrogenation |
|---|---|
| 0.5 | 26 |
| 1.0 | 32 |
| 2.0 | 43 |

These results correspond to a first order reaction rate constant of about 0.16% hr.$^{-1}$.

EXAMPLES 22–29

The sulfided catalyst used in Example 21 was activated with triethyl aluminum in the manner described in Example 2, the final treatment at 400° F. being carried out in the presence of hydrogen. This catalyst was also analyzed for sulfur content before and after the AlEt$_3$ activation; it contained 3.53 percent S before AlEt$_3$ activation and 3.54 percent S after activation indicating that no sulfur is removed by the AlEt$_3$ activation.

The AlEt$_3$ activated sulfided catalyst was tested in a series of octene hydrogenation runs in which varying amounts of sulfur compounds (thiophene) and aluminum triethyl were added. The example shown in Table II show that the deactivation effect of sulfur can be compensated by addition of small concentrations of triethyl aluminum.

HYDROGENATION OF OCTENE-1

[Catalyst: 8% Mo on F–1 alumina, sulfided, AlEt$_3$ activated temperature 300°F.; H$_2$ pressure, 600 p.s.i.g.]

| Example | Additives to feed, percent | | Rate constant, k | Relative activity |
|---|---|---|---|---|
| | Thiophene | AlEt$_3$ | | |
| 10 | | | 6.1 | 100 |
| 11 | 0.68 | | 3.2 | 53 |
| 12 | 0.068 | | 1.5 | 25 |
| 13 | | 0.75 | 6.0 | 99 |
| 14 | 0.68 | | 2.3 | 38 |
| 15 | 0.22 | 0.38 | 2.6 | 43 |
| 16 | 0.22 | 0.15 | 1.8 | 30 |

EXAMPLE 30

A commercial chromia-alumina dehydrogenation catalyst was sulfided at 950° F. for 17 hours, then at 1000° F. for 5 hours using 10–25 percent hydrogen sulfide in hydrogen. This catalyst (56 gms.) was tested for hydrogenation of octene-1 at 300° F. and 600 p.s.i.g. hydrogen pressure. There was essentially no activity under these conditions (about 0.1% hydrogenation in one hour).

The catalyst from the above operation was activated with AlEt$_3$ as described in Example 2, the final heat treatment being carried out in a hydrogen atmosphere. The activity determined for hydrogenation of octene-1 at 300° F., 600 p.s.i.g. hydrogen was as follows:

| Reaction time, hours— | Percent hydrogenation |
|---|---|
| 0.5 | 47 |
| 1.0 | 72 |
| 1.5 | 83 |
| 2.0 | 95 |
| 2.5 | 99 |

This corresponds to an absolute reaction rate constant (first order of 18% hr.$^{-1}$).

EXAMPLE 31

A manganese F–1 alumina catalyst was prepared by impregnating 200 gms. of the alumina base with a solution of 58 gms. of manganous acetate (tetrahydrate) in 100 cc. warm water. The dry catalyst contained about 9 percent Mn. This catalyst was heated in a nitrogen flow at 800° F. for 5 hours, then was sulfided for 17 hours at 800° F. using a mixture of hydrogen sulfide and hydrogen (10–20% hydrogen sulfide).

The sulfided catalyst (43 gms.) was tested for hydrogenation of octene-1 at 300° F. and 600 p.s.i.g. hydrogen pressure and was found to be essentially inactive (about 0.1% hydrogenation in 2 hours).

The same catalyst was then activated with AlEt$_3$ as described in previous examples; the final treatment was carried out in an atmosphere of hydrogen at 425° F. for one hour.

The hydrogenation test on the AlEt$_3$ activated manganese catalyst (300° F., 600 p.s.i.g. hydrogen, octene-1 feed) gave the following results:

| Reaction time, hrs.: | Percent hydrogenation |
|---|---|
| 2 | 12 |
| 4 | 23 |
| 6 | 32 |

Although this catalyst is considerably less active than most of the others, the results show very clearly that this activation technique is also applicable to manganese.

EXAMPLE 32

A vanadium catalyst was prepared by impregnating 200 gms. F-1 alumina with a solution prepared by dissolving 28 gms. ammonium meta vanadate ($NH_4VO_3$) in a mixture of 50 cc. monoethanolamine and 70 cc. water. The vacuum dried catalyst contained about 5 percent V.

The catalyst was treated in a flow of dry nitrogen for 4½ hours at 800° F. and was then sulfided at 800° F. as described in Example 31.

The sulfided catalyst (43 gms.) was tested for hydrogenation of octene-1 (250 cc.) at 300° F. and 600 p.s.i.g. hydrogen pressure. The catalyst showed slight activity giving 7.1 percent hydrogenation of the octene in 3 hours on conditions.

The same catalyst was then activated with $AlEt_3$ as described in previous examples. Hydrogenation activity for octene-1 for the $AlEt_3$ activated catalyst was as follows:

| Reaction time, min.: | Percent hydrogenation |
|---|---|
| 5 | 62.7 |
| 10 | 82.3 |
| 15 | 96.0 |
| 25 | 99.5 |

This $AlEt_3$ activated sulfided vanadium catalyst thus shows very high hydrogenation activity corresponding to an absolute reaction rate constant of 13.5 percent hr.$^{-1}$.

EXAMPLE 33

A nickel-tungsten on alumina catalyst containing 2.5% NiO and 12% $WO_3$ was heat-treated at a temperature of 800° F. in a nitrogen atmosphere for two hours. Thereafter, the impregnated, supported catalyst was contacted with hydrogen sulfide (10% $H_2S$ in hydrogen) at a temperature of 800° F. for 14 hours and then stripped with hydrogen for 1 hour. The first order kinetics are shown below when this catalyst is treated as indicated and then employed for the hydrogenation of octene-1 in benzene at 600 p.s.i.g.

| | $AlEt_3$ treat | Fixation Temp., °F. | Fixation Gas | 1st order kinetics Percent min.$^{-1}$ | At °F. |
|---|---|---|---|---|---|
| Run: | | | | | |
| A | No | | | 0.325 | 300 |
| B | Yes | 400 | $N_2$ | 2.1 | 125 |
| C | Yes | 400 | $H_2$ | 4.0 | 125 |
| D | Yes | 900 | $H_2$ | 6.2 | 125 |

As can be seen from the results as tabulated above, as the severity of the fixation conditions are increased, i.e. temperature increase in presence of hydrogen, the activity of the catalyst is markedly increased, even when employed under significantly milder (125° vs. 300° F.) hydrogenation conditions.

What is claimed is:

1. A process for forming a hydrogenation catalyst which comprises:

impregnating a support containing at least 0.1 millimole of hydroxyl groups per gram of support with an aqueous solution of a salt of a transition metal wherein the transition metal is selected from the group consisting of Groups I-B, IV-B, V-B, VI-B, VII-B, and Group VIII metals and mixtures thereof:

heat-treating the impregnated support at a temperature of at least about 500° F. to remove liquid and adsorbed oxygen;

contacting the heat-treated impregnated support with hydrogen sulfide at a temperature in the range of from 400° F. to about 1000° F.;

activating the heat-treated impregnated sulfided support by contacting same with a predominantly co-valently bonded organometallic compound having the formula: $QR_n$ wherein Q is selected from Groups I, II or III metals of the Periodic Chart of the Elements, R is selected from the group consisting of hydride, and alkyl, aryl, alkaryl, aralkyl, or cycloalkyl radicals containing from 1 to about 20 carbon atoms and wherein $n$ ranges from 1 to 3 and satisfies the valence of Q;

and thereafter treating the activated supported sulfide metal complex in the presence of hydrogen at a temperature of at least about 300° F.

2. The process of claim 1 wherein the support is selected from oxides of Groups II, III and IV of the Periodic Chart of the Elements.

3. The process of claim 1 wherein Q has an atomic number of from 3 to 50 and wherein $QR_n$ is a tri-alkyl aluminum.

4. The process of claim 1 wherein the activated supported sulfide metal complex is treated in the presence of hydrogen at a temperature above 400° F.

5. The process of claim 1 wherein the heat-treated impregnated support is contacted with a gaseous stream containing from about 0.1 to about 20% hydrogen sulfide.

6. A process for forming a sulfided hydrogenation catalyst which comprises:

impregnating a support having a surface area of at least 5 square meters per gram and containing at least 0.1 millimole of hydroxyl groups per gram of support with an aqueous solution of a salt of a transition metal wherein the transition metal is selected from the group consisting of Groups I-B, IV-B, V-B, VI-B, VII-B, and the Group VIII metals and mixtures thereof;

heat-treating the impregnated support at a temperature of at least about 500° F. in an inert atmosphere;

contacting the heat-treated impregnated support at a temperature in the range of from 400° to about 1000° F. with a gaseous stream containing from about 0.1 to about 20% hydrogen sulfide;

activating the heat-treated impregnated sulfided support by contacting the same with a predominantly co-valently bonded organo-metallic compound having the formula $QR_n$ wherein Q is selected from Groups I, II and III metals of the Periodic Chart of the Elements having an atomic number of from 3 to 50, R is selected from the groups consisting of hydride and alkyl, aryl, alkaryl, aralkyl and cycloalkyl radicals having from 1 to 20 carbon atoms, and wherein $n$ ranges from 1 to 3 and satisfies the valence of Q and thereafter treating the activated supported sulfide metal complex in the presence of hydrogen at a temperature of at least about 400° F.

7. The process of claim 6 wherein the support is selected from the oxides of Groups II, III and IV of the Periodic Chart of the Elements.

8. The process of claim 6 wherein the amount of transition metal impregnated on the support is in the range of from 0.1 to about 30% based on the total weight of the deposited equivalent metal and support.

9. The process of claim 6 wherein the impregnated support is heat-treated in an inert atmosphere at a temperature in the range of from about 600 to about 1500 F.

10. The process of claim 6 wherein the heat-treated impregnated support is activated by contacting the same with a hydrocarbon solution of a tri-alkyl aluminum wherein the alkyl groups contain from 1 to about 6 carbon atoms.

11. The process of claim 6 wherein the activated supported sulfide metal complex is treated in the presence of hydrogen at a temperature in the range of from about 400 to about 1200° F.

12. The process of claim 6 wherein the activated supported sulfide metal complex is treated in the presence of a gaseous stream containing from about 75 to about 100% hydrogen.

13. The process of claim 6 wherein the heat-treated impregnated support is contacted with a gaseous stream containing from about 1 to about 10% hydrogen sulfide.

14. The process of claim 13 wherein the supported metal complex is contacted with hydrogen sulfide at a temperature in the range of from about 600 to about 800° F.

15. A process for forming a sulfided hydrogenation catalyst which comprises:
impregnating a support having a surface area of at least 5 square meters per gram and containing at least about 0.1 millimole of hydroxyl groups per gram of support with an aqueous solution of a salt of a transition metal selected from Groups I-B, IV-B, V-B, VI-B, VII-B and Group III metals and mixtures thereof;
heat-treating the impregnated support in an inert atmosphere at a temperature in the range of from about 600 to about 1500° F.;
contacting the heat-treated impregnated support with a gaseous stream containing from about 1 to about 10% hydrogen sulfide at a temperature in the range of from about 400° to about 1000° F.;
activating the heat-treated impregnated sulfided support by contacting same with a hydrocarbon soluble trialkyl aluminum compound wherein the alkyl groups contain from 1 to about 6 carbon atoms; and thereafter treating the activated supported sulfided metal complex in the presence of hydrogen at a temperature of at least about 300° F.

16. The process of claim 15 wherein the support is selected from the oxides of Groups II, III and IV of the Periodic Chart of the Elements.

17. The process of claim 15 wherein the support has a surface area of at least 50 square meters per gram and a hydroxyl group content of at least about 0.2 millimole of hydroxyl groups per gram of support.

18. The process of claim 15 wherein the support is aluminum oxide having a surface area of above about 100 square meters per gram and a hydroxyl content of at least 1 millimole per gram of support.

19. The process of claim 15 wherein the support is impregnated with an aqueous salt of a transition metal selected from the group consisting of iron, cobalt, nickel, platinum, tungsten, chromium, molybdenum, vanadium, rhenium, copper and mixtures thereof.

20. The process of claim 15 wherein the impregnated support is heat-treated in an inert atmosphere at a temperature in the range of from about 600 to about 1000° F.

21. The process of claim 15 wherein the amount of trialkyl aluminum compound in the hydrocarbon diluent is in the range of from about 5–50%.

22. The process of claim 15 wherein the activated supported sulfide metal complex is treated in the presence of a gaseous stream containing from about 75 to about 100% hydrogen at a temperature in the range of from about 400 to about 1200° F.

23. The process of claim 22 wherein the activated supported sulfide metal complex is treated in a hydrogen atmosphere at a temperature in the range of from about 800 to about 1200° F.

24. The process of claim 21 wherein the supported metal complex is contacted with hydrogen sulfide in the vapor phase at a temperature in the range of from about 600 to about 800° F.

25. The process of claim 15 wherein the supported sulfide metal complex formed by contacting the supported metal complex with a gaseous stream containing from about 1 to about 10% hydrogen sulfide is contacted with a stripping reagent selected from the group consisting of hydrogen, nitrogen, or inert gases at a temperature in the range of from about 400° to about 1000° F. in order to remove residual hydrogen sulfide.

26. The process of claim 25 wherein said stripping reagent is nitrogen.

27. The process of claim 26 wherein said stripipng reagent is hydrogen.

References Cited
UNITED STATES PATENTS

| | | | |
|---|---|---|---|
| 2,145,657 | 1/1939 | Ipatneff | 196—24 |
| 2,875,158 | 2/1959 | Winstrom | 252—439 |
| 3,153,678 | 10/1964 | Logemann | 260—667 |
| 3,536,632 | 10/1970 | Kroll | 252—430 |
| 3,415,759 | 12/1968 | Johnson | 252—455 |
| 3,113,931 | 12/1963 | Voltz | 252—442 |
| 3,288,725 | 11/1966 | Aftandilian | 252—447 |
| 3,221,002 | 11/1965 | Orzrchrowski | 260—94.9 |
| 3,205,178 | 9/1965 | Orzrchowski | 252—429 |

DANIEL E. WYMAN, Primary Examiner

P. M. FRENCH, Assistant Examiner

U.S. Cl. X.R.

252—430, 429 R, 428